(12) United States Patent
Gold et al.

(10) Patent No.: US 11,511,518 B2
(45) Date of Patent: *Nov. 29, 2022

(54) WEARABLE SURFACE COVER AND METHOD OF MANUFACTURE

(71) Applicant: STARJ LLC, Manalapan, NJ (US)

(72) Inventors: Amy L. Gold, Manalapan, NJ (US);
Tyler B. Gold, Manalapan, NJ (US);
Spencer B. Gold, Manalapan, NJ (US);
Julia A. Gold, Manalapan, NJ (US)

(73) Assignee: STARJ LLC, Manalapan, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/841,087

(22) Filed: Apr. 6, 2020

(65) Prior Publication Data
US 2020/0230916 A1    Jul. 23, 2020

Related U.S. Application Data

(62) Division of application No. 15/911,255, filed on Mar. 5, 2018, now Pat. No. 10,618,254.

(51) Int. Cl.
| | | |
|---|---|---|
| *B32B 7/12* | (2006.01) | |
| *B32B 27/28* | (2006.01) | |
| *B32B 27/06* | (2006.01) | |
| *B32B 9/00* | (2006.01) | |

(52) U.S. Cl.
CPC ............... *B32B 7/12* (2013.01); *B32B 9/005* (2013.01); *B32B 27/06* (2013.01); *B32B 27/283* (2013.01); *B32B 2307/412* (2013.01); *B32B 2307/414* (2013.01); *B32B 2451/00* (2013.01); *B32B 2457/00* (2013.01)

(58) Field of Classification Search
CPC ............. A61N 5/0614; A61N 2005/0657; B32B 7/12; B32B 9/005; B32B 27/283; B32B 27/06; B32B 2457/00; B32B 2307/412; B32B 2307/414; B32B 2451/00
See application file for complete search history.

(56) References Cited

U.S. PATENT DOCUMENTS 2,851,805 A * 9/1958 Allen ................ A61Q 1/025
                                                  132/319
5,021,275 A   6/1991 Kim
5,344,681 A   9/1994 Calhoun et al.
(Continued)

FOREIGN PATENT DOCUMENTS

CA        2758360 A1 * 10/2012
CN     204625535 U    9/2015
(Continued)

OTHER PUBLICATIONS

3M Tegaderm Film Medical Dressing 1624W, on or before Apr. 21, 2017; 4 pages.

*Primary Examiner* — Nathan J Jenness
(74) *Attorney, Agent, or Firm* — Barclay Damon LLP

(57) ABSTRACT

A wearable surface cover and method are described herein. The wearable surface cover, in an embodiment, has at least one layer. The at least one layer has an inner surface configured to be removably coupled to a target surface, an outer surface, and silicone. The at least one layer defines an opening that extends through the at least one layer to expose the target surface to an environment.

20 Claims, 12 Drawing Sheets

(56) References Cited

U.S. PATENT DOCUMENTS

| | | | |
|---|---|---|---|
| 5,470,351 A * | 11/1995 | Ross | A61N 5/06 132/319 |
| D367,730 S * | 3/1996 | Chiavetta | D11/121 |
| 5,811,108 A * | 9/1998 | Goeringer | A61K 8/0208 424/401 |
| 5,836,998 A | 11/1998 | Mueller et al. | |
| 5,948,502 A * | 9/1999 | Harden | A61N 5/0614 428/99 |
| 5,976,173 A * | 11/1999 | Berke | A61F 5/08 128/858 |
| 6,781,248 B2 | 8/2004 | Hui et al. | |
| 7,575,649 B2 | 8/2009 | Arippol | |
| 7,625,625 B2 | 12/2009 | Rios et al. | |
| 8,118,851 B1 * | 2/2012 | Kurzmiller | A61N 5/0614 607/95 |
| 8,518,510 B1 | 8/2013 | Wheatley et al. | |
| 9,796,885 B2 | 10/2017 | Bartusiak et al. | |
| 2004/0043178 A1 | 3/2004 | Andrews | |
| 2004/0098841 A1 | 5/2004 | Crosby et al. | |
| 2005/0147654 A1 * | 7/2005 | Matloub | A61Q 19/00 424/443 |
| 2006/0040078 A1 | 2/2006 | Briese et al. | |
| 2006/0107850 A1 | 5/2006 | Rinaldi et al. | |
| 2008/0113140 A1 | 5/2008 | Shah | |
| 2009/0291241 A1 | 11/2009 | Rummage | |
| 2009/0313849 A1 * | 12/2009 | Shelton | A43B 23/24 36/11.5 |
| 2013/0240804 A1 * | 9/2013 | Pagba | G03C 1/73 252/586 |
| 2014/0372954 A1 * | 12/2014 | Smith | G06F 3/04842 715/835 |
| 2016/0120292 A1 * | 5/2016 | Albate | A45D 44/00 132/319 |
| 2017/0181527 A1 | 6/2017 | Nunez Albalate | |
| 2017/0297364 A1 | 10/2017 | Moetteli | |
| 2018/0008473 A1 * | 1/2018 | Klein | A61F 13/00063 |

FOREIGN PATENT DOCUMENTS

| | | | |
|---|---|---|---|
| CN | 106785209 A | 5/2017 | |
| DE | 19805583 A1 * | 8/1999 | B44C 1/005 |
| KR | 101631317 | 10/2016 | |
| KR | 1020170110998 | 10/2017 | |
| WO | 2017165744 | 9/2017 | |

* cited by examiner

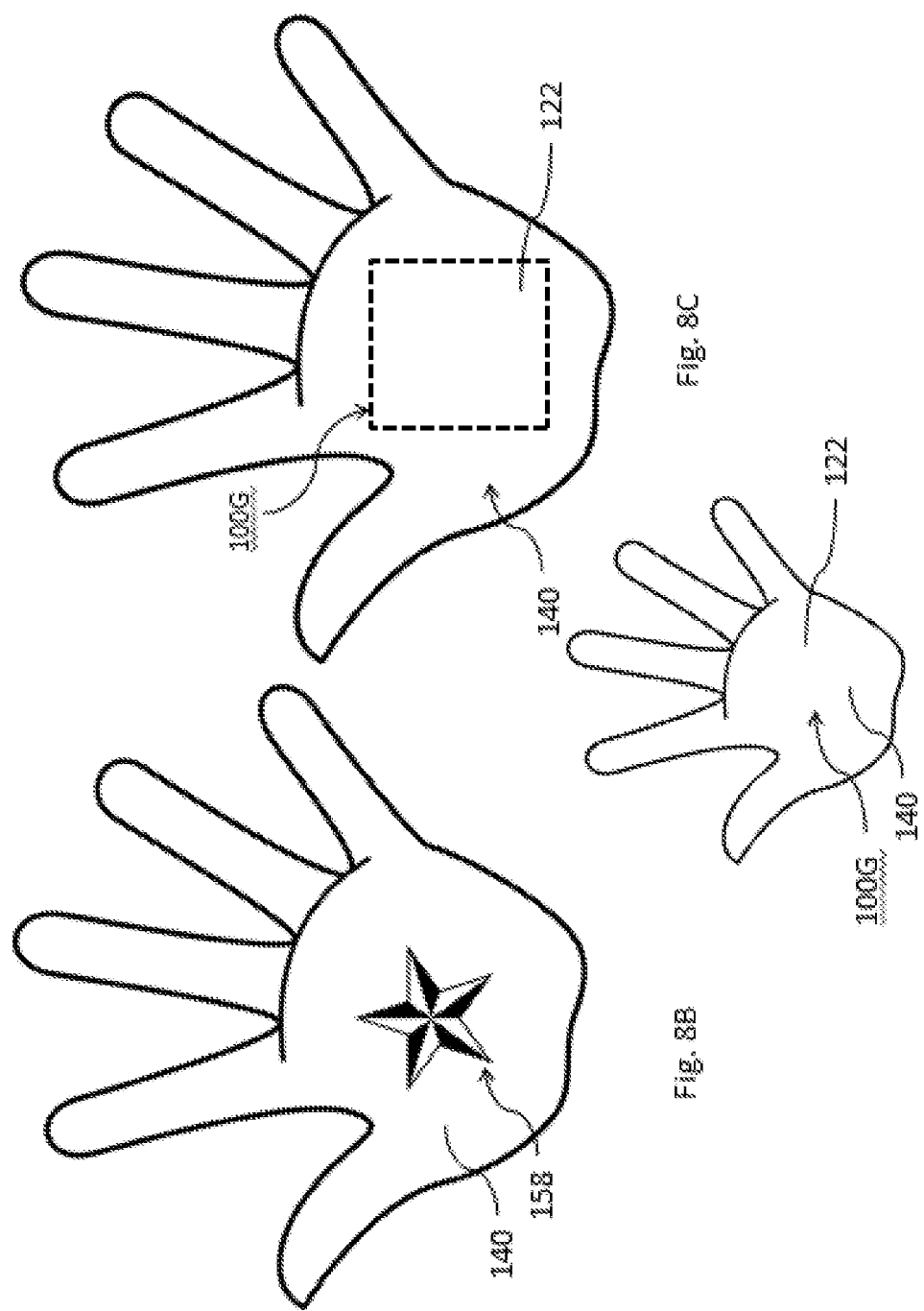

WEARABLE SURFACE COVER AND METHOD OF MANUFACTURE

CROSS-REFERENCE TO RELATED APPLICATION

This application is a divisional of, and claims the benefit and priority of, U.S. patent application Ser. No. 15/911,255 filed on Mar. 5, 2018. The entire contents of such application are hereby incorporated herein by reference.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

There is an increasing desire to customize the appearance of structures, items, and body surfaces, such as arms and legs. Surface customization can provide aesthetic and utility advantages. However, the cost of customization can be prohibitive and burdensome in terms of time and labor. The conventional tapes, skins, and covers fail to satisfy the decoration demands, utility requirements, ease of use and versatility needs of individuals and families.

The foregoing background describes some, but not necessarily all, of the problems, disadvantages and shortcomings related to surface customization.

SUMMARY

A reusable surface cover, in an embodiment, includes at least one layer configured to be removably coupled to a target surface. The at least one layer includes silicone. The at least one layer is configured to secure a plurality of objects to the target surface.

In another embodiment, the reusable surface cover includes: (a) an attachment portion having an adhesive configured to be removably coupled to a target surface; and (b) at least one layer supported by the attachment portion. The at least one layer includes silicone. A plurality of objects are coupled to the at least one layer.

In yet another embodiment, the reusable surface cover includes: (a) an attachment portion having an adhesive configured to be removably coupled to a target surface; (b) at least one layer supported by the attachment portion. The at least one layer includes silicone, and the at least one layer defines at least one inner perimeter. The at least one inner perimeter defines an opening that extends through the at least one layer. The opening exposes the target surface to an environment.

Additional features and advantages of the present disclosure are described in, and will be apparent from, the following Brief Description of the Drawings and Detailed Description.

BRIEF DESCRIPTION OF THE DRAWINGS

FIG. 8B is a top view of a target skin surface having an undesirable mark.

FIG. 8C is a top view of the target skin surface of FIG. 8B, illustrating the reusable surface cover adhered to the target skin surface so as to cover and conceal the mark.

FIG. 8D is a top view of the target skin surface of FIG. 8B, illustrating the color coordination of the reusable surface cover with the skin color so that the reusable surface cover has no substantial visual distinction with the target skin surface.

DETAILED DESCRIPTION

Figure 1:
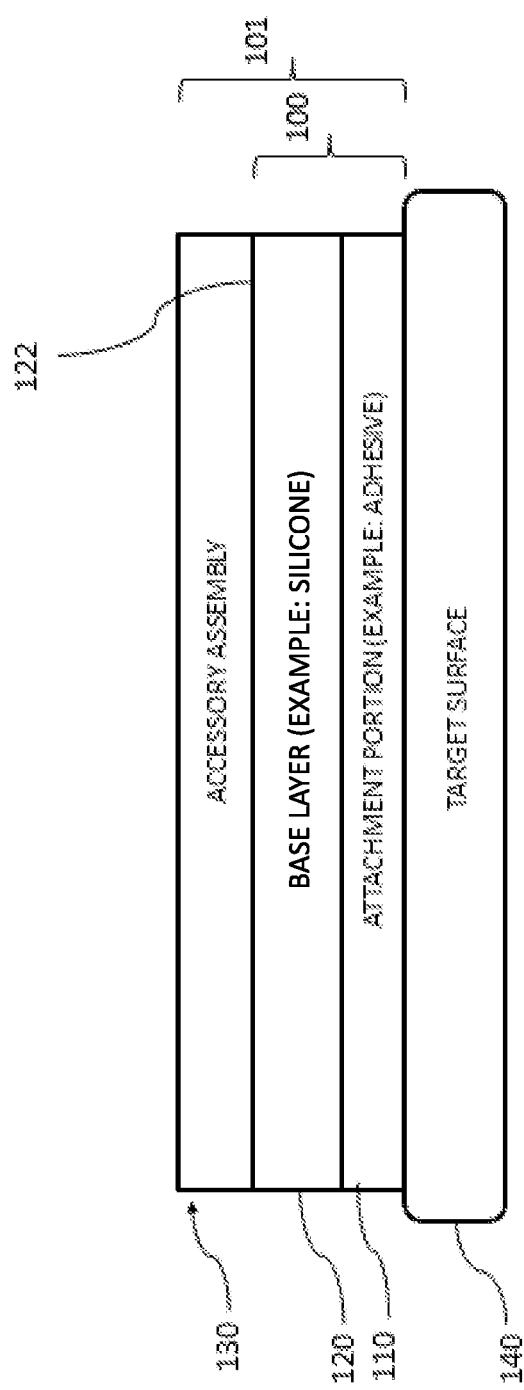
FIG. 1 is a side schematic diagram of an embodiment of the reusable surface cover coupled to an accessory assembly.

The following discussion relates to various embodiments of a reusable surface cover with integrated elements. It will be understood that the herein described versions are examples that embody certain inventive concepts as detailed herein. To that end, other variations and modifications will be readily apparent to those of sufficient skill. In addition, certain terms are used throughout this discussion in order to provide a suitable frame of reference with regard to the accompanying drawings. These terms such as "periphery", "interior", "exterior", "front", "back", "inner", "external", "top", "bottom", and the like are not intended to limit these concepts, except where so specifically indicated. With regard to the drawings, their purpose is to depict salient features of the disclosed subject matter and are not specifically provided to scale.

This disclosure generally relates to a reusable tape, skin or surface cover 100. In an embodiment illustrated in FIG. 1, the reusable surface cover 100 has: (a) one or more substrates, such as base layer 120; and (b) an attachment portion 110 applied or secured to the bottom of the base layer 120. Depending upon the embodiment, base layer 120 can include multiple sublayers or multiple substrates.

The base layer 120 has an outer surface 122 exposed to the environment, and the base layer 120 is configured to incorporate, integrate, embed, hold, secure, grasp, anchor or otherwise support one or more features, elements, devices or objects 132. As illustrated in FIGS. 1-4, a plurality or set of objects 132 can be arranged to form an accessory assembly 130. In the embodiment illustrated in FIG. 1, reusable surface cover 101 includes the combination of the reusable surface cover 100 with the accessory assembly 130.

The reusable surface cover 100 can be any shape or size, and can be configured in rolls, sheets or other forms for any storage or dispensing method. In one embodiment, the reusable surface cover 100 can include one or more designated symbols, such as letters, numbers, pictures, artwork, drawings or images.

In the embodiment illustrated in FIG. 1, the reusable surface cover 100 illustrates the base layer 120 as distinct from a layer of the attachment portion 110. It should be appreciated, however, that in other embodiments, one or more of these layers may be integrated with each other such that they are not clearly distinguishable. Also, in the example shown in FIG. 1, the accessory assembly 130 has a surface 122 area as large as the base layer 120. Therefore, the base layer 120 would be concealed by the accessory assembly 130. Depending upon the embodiment, area of outer surface 122 can be larger than the surface area of the base layer 120 so that the accessory assembly 130 overhangs the base layer 120. In another embodiment described below, the area of outer surface 122 is smaller than the surface area of the base layer 120.

The reusable surface cover 100 can be removably attached to a target surface 140. Referring to FIG. 1, the attachment portion 110 can include a deposit or layer of adhesive substance that is configured to releasably bond with a variety of target surfaces 140, including fabric, stone, metal, drywall, plaster, glass, wood, plastic, skin, ceramic, and the like. The attachment portion 110 is configured to be easily removed from the target surface 140 without damaging the target surface 140 while leaving little or no adhesive residue behind. In an embodiment, the attachment portion 110 is an adhesive layer that may be applied as a full layer or may not be applied as a full layer such as only being applied in glue dots or glue lines around the edges or away from the edges of the reusable surface cover 100.

In an embodiment, the attachment portion 110 includes an adhesive that is configured to repeatedly stick and unstick so that the attachment portion 110 can be adhered to a target surface 140, removed from the target surface 140 and then re-adhered to the target surface 140 on multiple occasions. In this way, the adhesive is reusable or otherwise has reuse functionality. Depending upon the embodiment, the adhesive of the attachment portion 110 can be a removable adhesive configured to form a temporary bond or a suitable pressure sensitive adhesive. Depending upon the embodiment, the substance of the attachment portion 110 can include silicone, a silicone-based adhesive, rubber (synthetic or natural), an acrylic-based dispersion adhesive, an acrylate-based polymer, a butyl rubber compound, any suitable material having characteristics of a pressure-sensitive adhesive or reusable adhesive, or any suitable combination of the foregoing.

In other embodiments, the adhesive layer may vary in size, thickness and composition depending on the type of end-use of the reusable surface cover 100. For example, heavier objects 132 (FIGS. 2-4) may require a thicker layer of adhesive or a different adhesive composition to ensure the reusable surface cover 100 remains securely attached to the target surface 140 until the user desires it to be removed. In another embodiment, the adhesive layer of the attachment portion 110 may have adhesive characteristics associated with the material characteristics of the specific target surface 140, which may be fabric, drywall, plaster, wood, granite, or any other suitable surface. In an embodiment, the adhesive of attachment portion 110 includes a cohesive characteristic that enables a static clinging to the target surface 140 without the use of an adhesive substance.

In another embodiment, the attachment portion 110 may comprise one or more magnets configured to magnetically couple the reusable surface cover 100 to the target surface 140. The one or more magnets may be arranged in any configuration suitable for securely attaching the reusable surface cover 100 to the target surface 140. The one or more magnets may be separately adhered to the base layer 120 of the reusable surface cover 100 or may be secured within the base layer 120 such that the one or more magnets are integral with the base layer 120. In another embodiment, one or more magnets may be used on an opposite side of the target surface 140 such that the one or more magnets on the opposite side of the target surface 140 is attracted to the one or more magnets in the reusable surface cover 100 to secure the reusable surface cover 100 onto the target surface 140. In an embodiment, the one or more magnets comprise a magnetic thread or cord.

In a further embodiment, the attachment portion 110 may comprise a hook and loop configuration or any other suitable device for attaching the reusable surface cover 100 to the target surface 140 that allows for easy attachment and removal without damaging the target surface 140.

In the embodiment shown in FIG. 1, the base layer 120 is generally positioned between the attachment portion 110 and the accessory assembly 130. In other embodiments, however, one or more parts of the accessory assembly 130 can be fully or partially positioned within the base layer 120. The base layer 120 can have a consistent material composition, or the base layer 120 can have a non-uniform composition with different materials, properties, density distributions or other factors. Also, the base layer 120 can have a consistent thickness or an inconsistent thickness.

In an embodiment, the base layer 120 is composed, at least partially, of silicone, a silicone-like material, a silicone-based substance or any material having physical properties substantially similar to silicone. Depending upon the embodiment, the base layer 120 can include one or more additional materials to achieve the desired properties of the base layer 120. In an embodiment, the base layer 120 is resistant to moisture and heat and is stable in light and dark environments. The base layer 120 can be a solid, semisolid, gel, or any other suitable pliable, stable, and supple material. In an embodiment, the base layer 120 can include one or more electrically conductive materials to enable the base layer 120 to conduct an electrical current. Depending upon embodiment, the base layer 120 and the attachment portion 110 can be transparent, see-through, translucent or opaque.

Figure 1A:
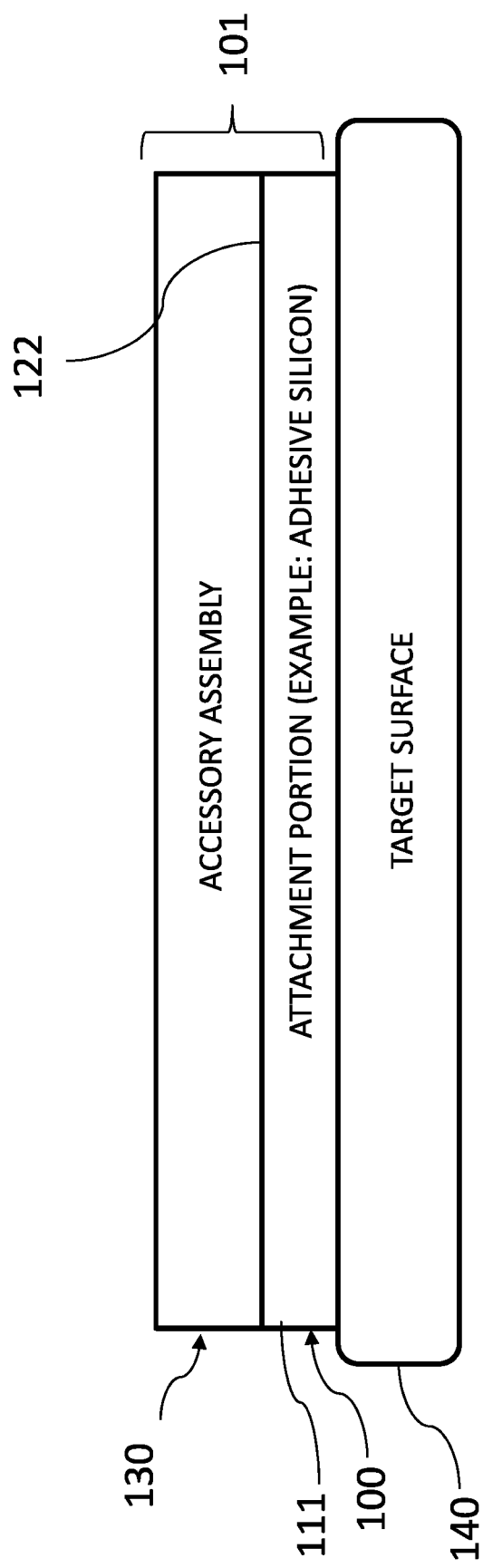
FIG. 1A is a side schematic diagram of another embodiment of the reusable surface cover coupled to an accessory assembly, illustrating a single layer attachment portion having a silicone-based, adhesive substance.

In an embodiment illustrated in FIG. 1A, the reusable surface cover 100 is a single substrate or single layer of the attachment portion 111. In this embodiment, the attachment portion 111 includes a substance having silicone and an adhesive characteristic. Depending upon the embodiment, the substance of the attachment portion 111 includes silicone alone or in combination with rubber (synthetic or natural), an acrylic-based dispersion adhesive, an acrylate-based polymer, a butyl rubber compound, or any suitable material having characteristics of a pressure-sensitive adhesive or reusable adhesive.

Figure 2:
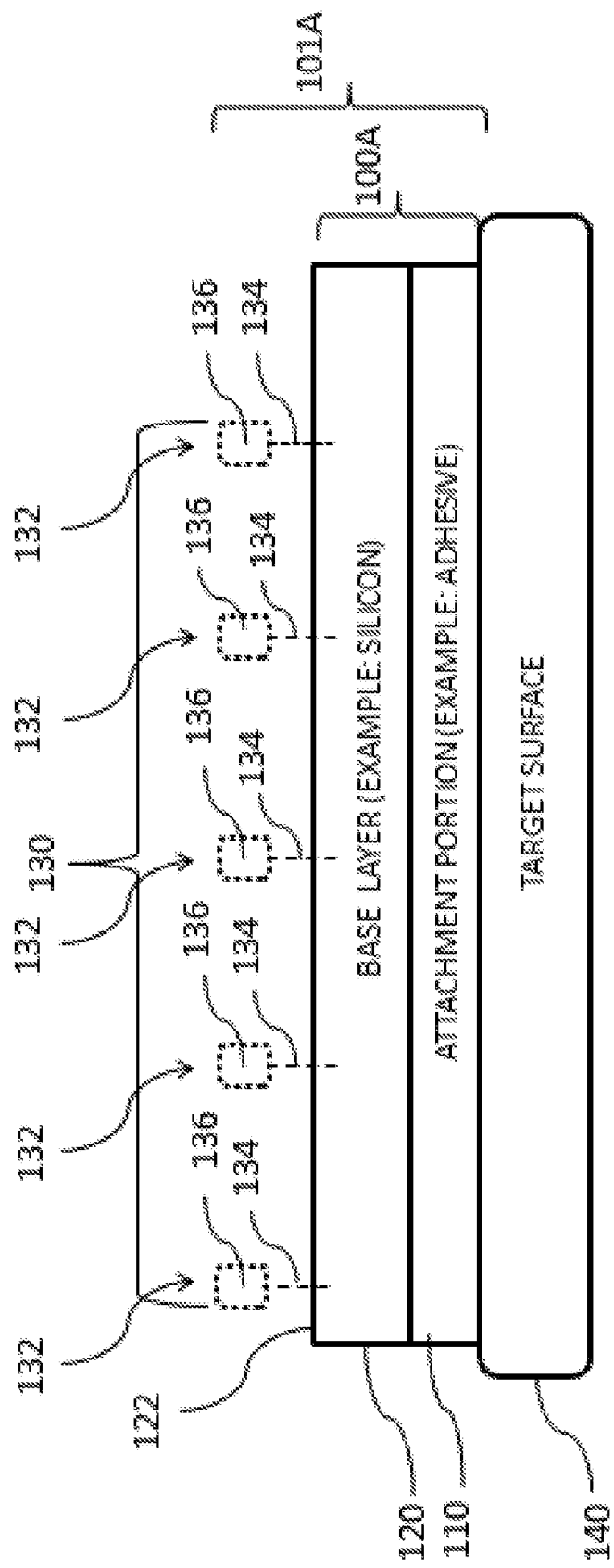
FIG. 2 is a side schematic diagram of an embodiment of the reusable surface cover having a base layer coupled to an accessory assembly through a plurality of couplers.

Referring to FIG. 2, in an embodiment, the accessory assembly 130 is partially embedded in the base layer 120 such that no additional attachment device is required to attach the accessory assembly 130 to the reusable surface cover 100. Each object 132 of the accessory assembly 130 can include one or more useful components, devices, decorative or functional objects, embellishments, materials, or any combination thereof that is coupled to the base layer 120. The objects 132 can be fully or partially embedded into the base layer 120. By way of example, objects 132 may include embellishments such as pearls, sequences, rhinestones, fur, leather, suede, glass, beads, plastic, coins, fabric, stones, wood, metal, chain, light source devices or lights sources (e.g., light emitting diode (LED) lights), fluorescent elements, luminescent elements, light emitters, sound emitters, batteries, magnets or electronic devices. The method of coupling the objects 132 to the base layer 120 may vary depending on the nature of the target surface 140, base layer 120, or both. For example, the base layer 120 may include additives or materials that aide in the retention of the objects 132.

As illustrated in FIG. 2, the accessory assembly 130 has one or more objects 132, each of which includes: (a) a leg, extension, or coupler 134; and (b) a head or element 136 configured to couple the coupler 134. The base layer 120 securely receives the coupler 134 for anchoring the objects 132 to the reusable surface cover 100A. In this embodiment, reusable surface cover 101A includes the combination of the reusable surface cover 100A with the accessory assembly 130.

Figure 3:
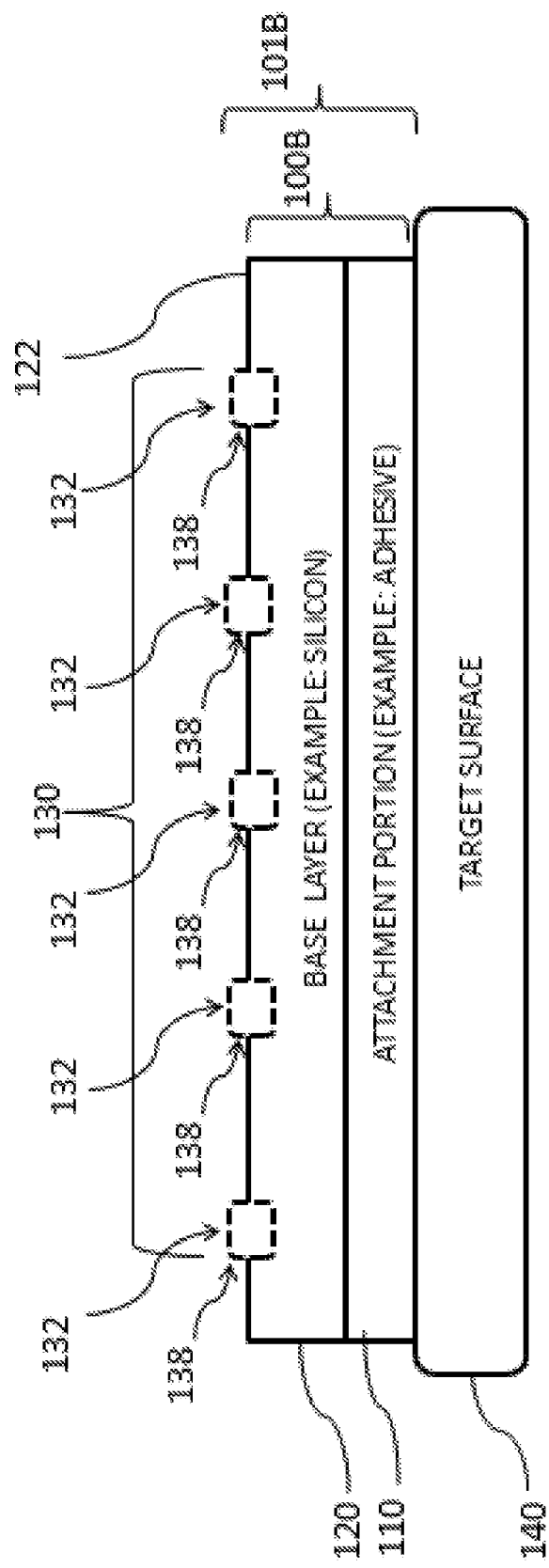
FIG. 3 is a side schematic diagram of an embodiment of the reusable surface cover having a base layer coupled to an accessory assembly that is partially integrated into the base layer.

Referring to FIG. 3, the reusable surface cover 100B includes an accessory assembly 130 having one or more objects 132 that are partially (not fully) embedded in the base layer 120. As shown, the upper object portion 138 of each object 132 protrudes from the outer surface 122 of the base layer 120. In this embodiment, reusable surface cover 101B includes the combination of the reusable surface cover 100B with the accessory assembly 130.

Figure 4:
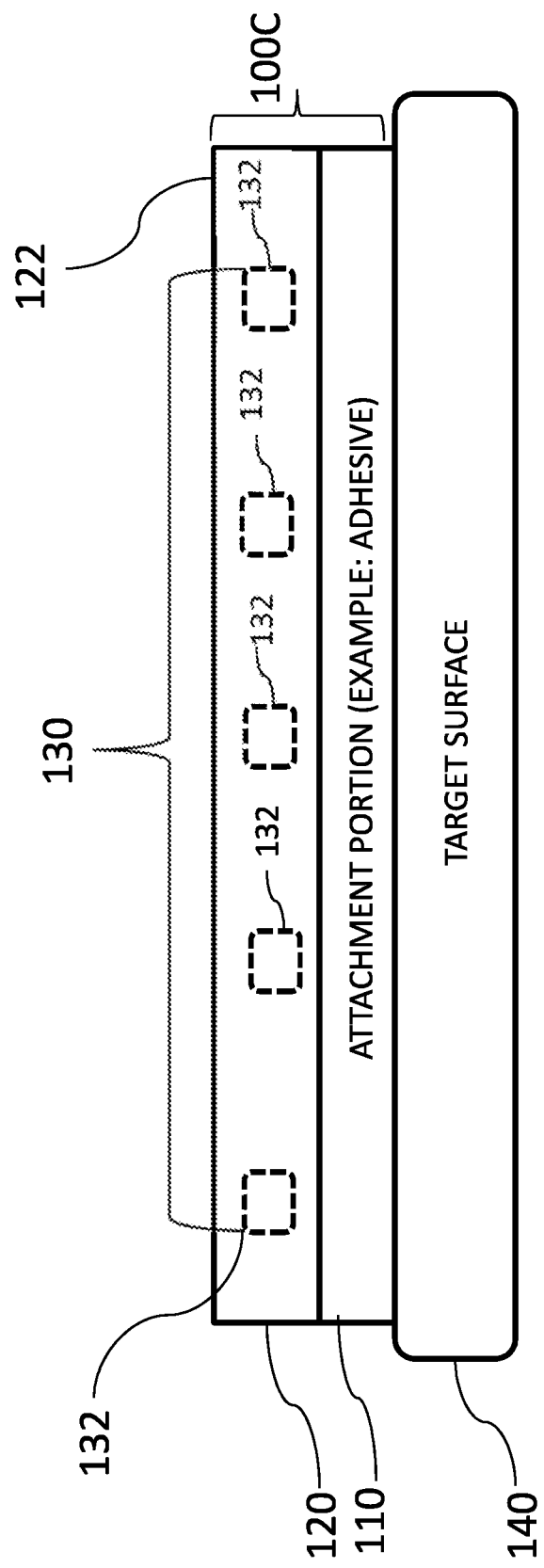
FIG. 4 is a side schematic diagram of an embodiment of the reusable surface cover having an accessory assembly fully integrated or otherwise embedded into a base layer.

In the embodiment shown in FIG. 4, the reusable surface cover 100C includes an the accessory assembly 130 having one more objects 132. The objects 132 are fully embedded, housed and positioned within the base layer 120. As such, the objects 132 are located beneath the outer surface 122 of the base layer 120.

Depending upon the embodiment, the reusable surface cover 100 may be configured to define a single visual pattern, multiple visual patterns or a repeating visual pattern. The reusable surface cover 100 can also be configured to be cut into smaller pieces to fit to the target surface 140 or for the user to create new patterns or designs. As described above, the attachment portion 110 is configured to releasably attach to various types of fabric or the typical materials used to make clothing. The reusable surface cover 100 can be manufactured and sold in a flat sheet with a removable backing (not shown). The backing (not shown) is configured to stick to and prevent damage or degradation of the attachment portion 110. The backing (not shown) may be replaced after use of the reusable surface cover 100 such that the attachment portion 110 of the reusable surface cover 100 may be preserved for multiple uses.

In another embodiment, the same accessory assembly 130 may be tailored for use in decorating structures such as furniture, fixtures, walls, ceilings, windows, cars, boats, and the like. Another embodiment of the reusable surface cover 100 includes an accessory assembly 130 comprising a patterned paper such as wall paper or other similar material. The dimensions of multiple reusable surface covers 100 can vary, and they can be sold as a roll with or without a removable backing. The roll may vary in width and length according to the intended use. In one embodiment, the reusable surface cover 100 may have similar dimensions to a roll of wall paper.

As described above, the accessory assembly 130 can include objects 132 such as metal, wood, ceramic, stone, glass, leather, or other like materials or combinations thereof. When the accessory assembly 130 has at least some metal components or other components exhibiting magnetic properties, then magnetic beads or particles, or a magnetic thread may be incorporated in the base layer 120 such that magnetic forces between the beads and the components of the accessory assembly 130 form and aide in keeping the components attached to the reusable surface cover 100.

In another embodiment, the base layer 120 may include objects 132 as in FIG. 2, 3, or 4, as described above, but does not require an attachment portion 110. This is because the base layer 120 may itself attach directly to the target surface 140. This may be accomplished using an adhesive within the base layer 120, or by otherwise connecting or bonding the base layer 120 directly to the target surface 140. One method for doing so may involve manipulating or modifying one side of the base layer 120.

Figure 5A:
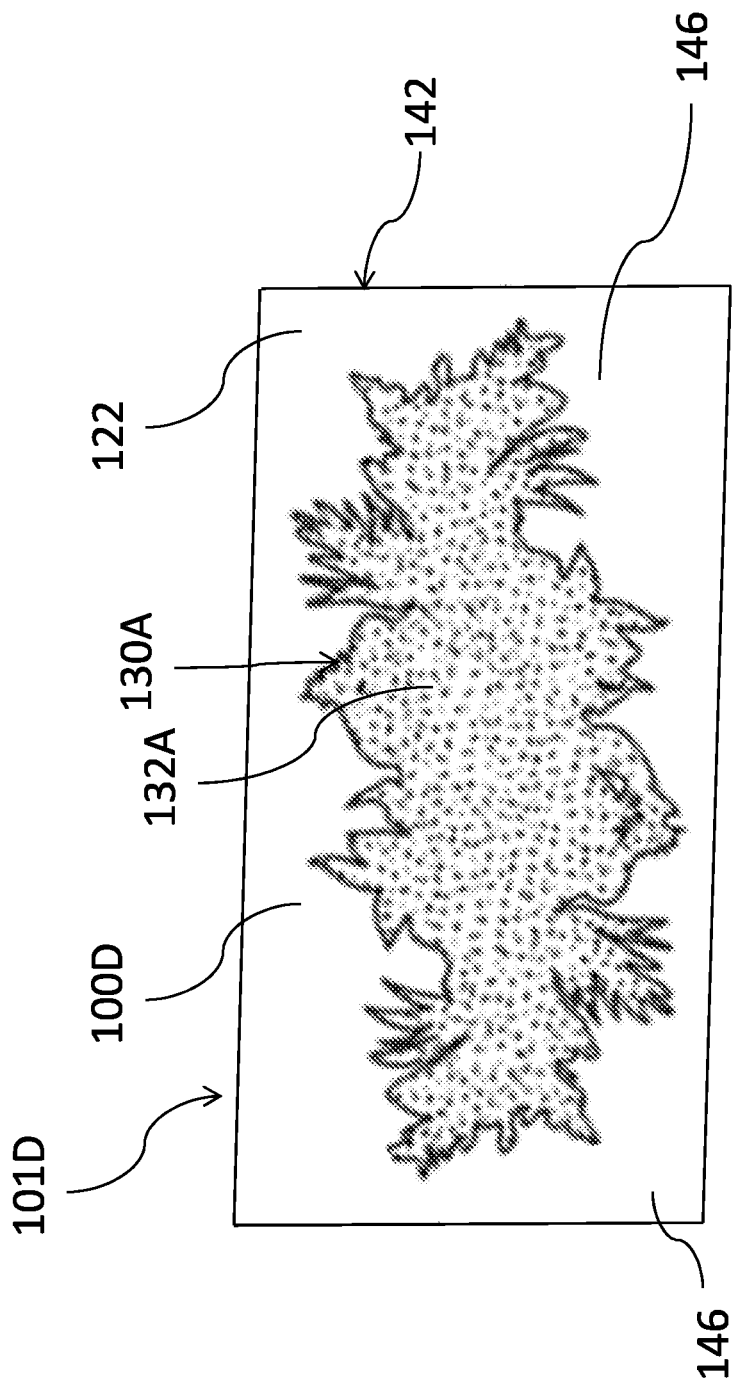
FIG. 5A is a top view of an embodiment of the reusable surface cover, illustrating the reusable surface cover before attachment to a target surface, illustrating an accessory assembly positioned within the perimeter of the reusable surface cover.

As shown in FIG. 5A, in an embodiment, the reusable surface cover 100D is configured to be coupled to the accessory assembly 130A. In this embodiment, the base layer 120 is fully or substantially transparent so that the outer surface 122 is see-through. The reusable surface cover 100D can be configured in the form of a flexible sheet 142 that can be rolled or folded for packaging purposes. In the example shown, the accessory assembly 130A includes a plurality of objects 132A, for example, ornamental beads, leather, fur, feathers, lace, fabric and/or fabric patterns, rhinestones, artificial leafs or flowers, sequins, tassels, gem-like stones to enhance the appearance of an article of clothing or accessory, or create an accessory, or any other suitable item or combinations thereof. As shown, the sheet 142 extends beyond the perimeter or bounds of the accessory portion 130A. This results in superfluous or supplemental regions 146 that are not covered by the accessory assembly 130A. In this embodiment, reusable surface cover 101D includes the combination of the reusable surface cover 100D with the accessory assembly 130A.

Figure 5B:
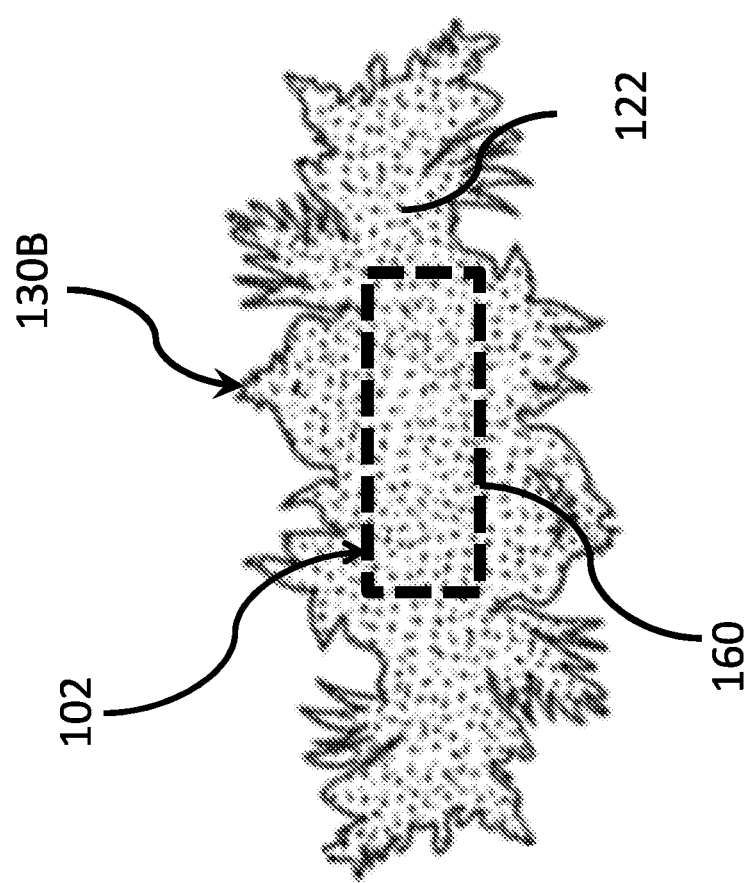
FIG. 5B is a top view of an embodiment of the reusable surface cover, illustrating the reusable surface cover before attachment to a target surface, illustrating an accessory assembly positioned beyond the perimeter of the reusable surface cover.

As illustrated in FIG. 5B, the accessory assembly 132A is positioned beyond the perimeter 160 of the reusable surface cover 102. In other words, the surface area of the accessory assembly 130B is greater than the surface area of the reusable surface cover 102. Consequently, the accessory assembly 130B covers, and entirely overlays, the outer surface 122 of the reusable surface cover 102. Accordingly, only the accessory assembly 130B is visible to the viewers. Depending upon the embodiment, the reusable surface cover 102 may be configured to be coupled to the accessory assembly 130B but not including the accessory assembly 130, or the reusable surface cover 102 may include the accessory assembly 130B.

Figure 5C:
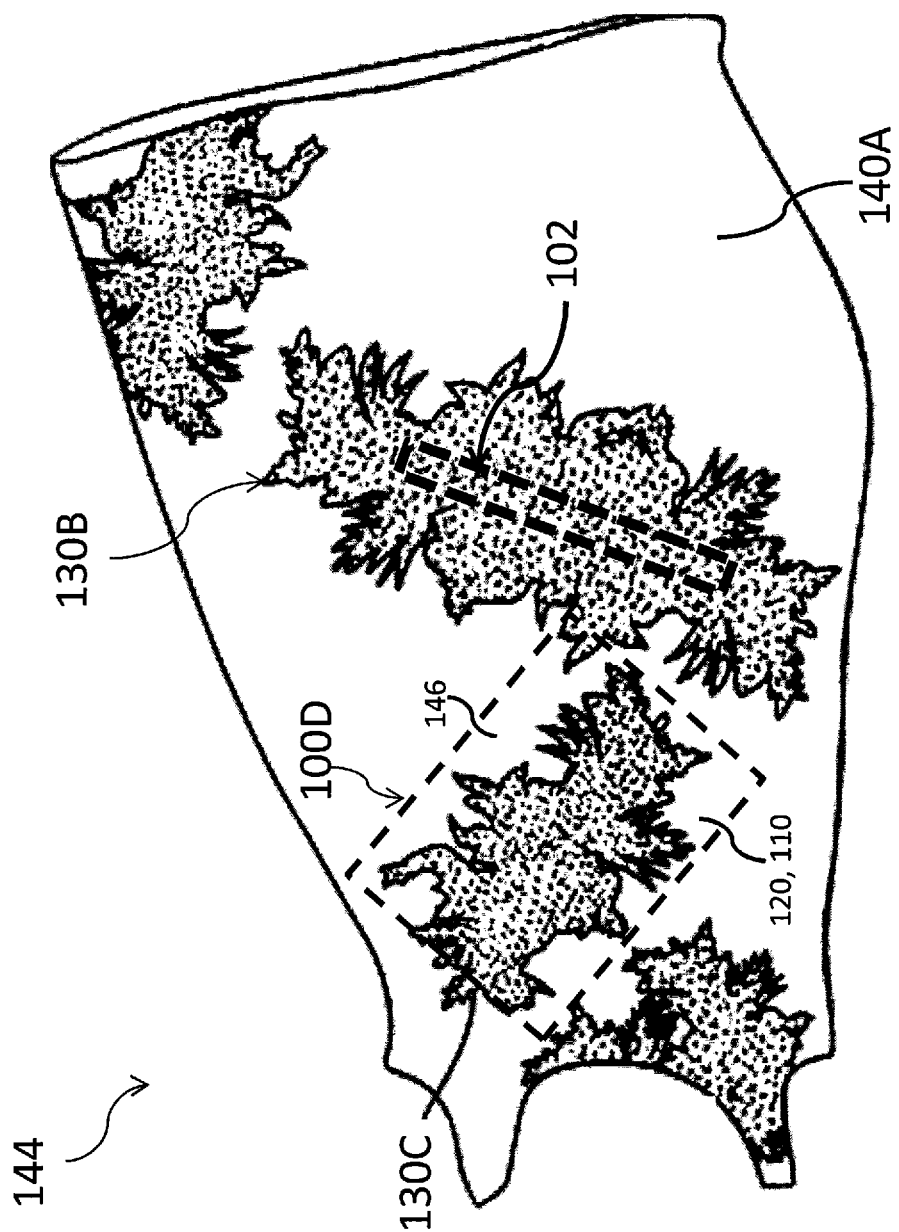
FIG. 5C is a top view of an embodiment of a target fabric surface (in the example shown, a garment) having portions covered by a plurality of reusable surface covers.

Referring to FIG. 5C, each of the reusable surface covers 102, 100D is configured to be adhered to a target fabric surface 140A of a garment 144, such as the dress in the example shown. In this example, the base layer 120 and the attachment portion 110 of reusable surface cover 100D are fully or substantially transparent, and they carry the accessory assembly 130C. As a result, the supplemental regions 146 are substantially not visually perceptible, providing see-through to the target fabric surface 140A. In contrast, the reusable surface cover 102 is entirely covered and hidden by the accessory assembly 130B, as shown.

Figure 6:
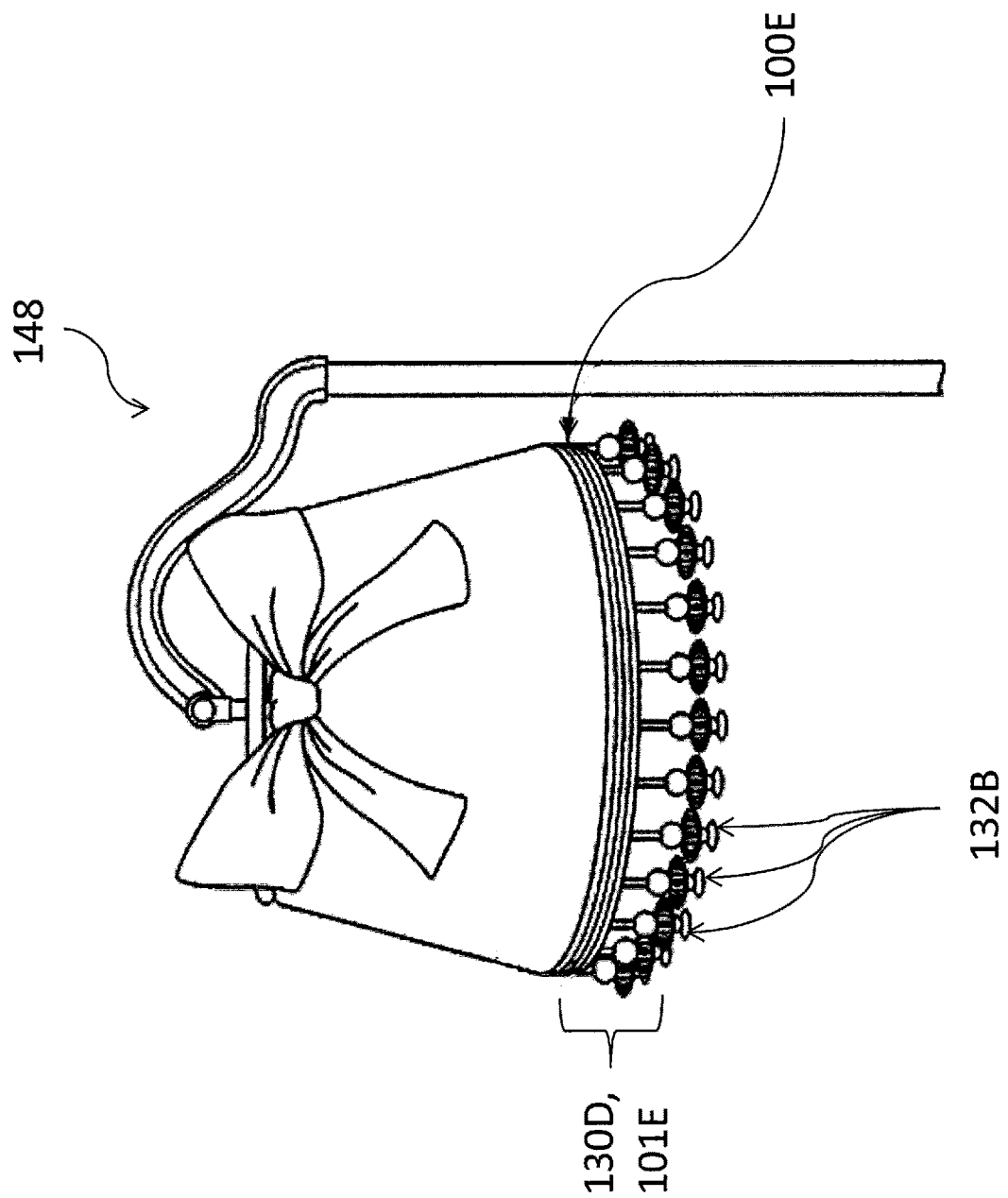
FIG. 6 is a side view of an embodiment of a household object (in the example shown, a lampshade) having a portion covered by an embodiment of the reusable that has tassel objects.

As shown in FIG. 6, the reusable surface cover 100E is configured to be adhered to a household item, such as a lampshade 148. In the embodiment, the reusable surface cover 100E is configured to be coupled to the accessory assembly 130D. When coupled, the accessory assembly 130D includes one or more objects 132B (such as tassels or feathers) that extend and hang beyond the bounds of the base layer 120 (FIG. 2). In another embodiment, the one or more objects 132B do not extend beyond the bounds of the base layer 120. In this embodiment, reusable surface cover 101E includes the combination of the reusable surface cover 100E with the accessory assembly 130D.

In a further embodiment, the objects 132 include wires or devices operable to conduct electrical current, a battery power source and one or more LEDs. In one embodiment, the wires and electrical elements are fully or partially disposed within the base layer 120. In an embodiment, at a terminal end of the reusable surface cover 100, an adapter (not shown) may be fitted to provide electrical current. The adapter (not shown) may include a plug configured to be received by an electrical socket or a battery pack configured to accept one or more batteries in order to power the one or more LEDs. The use of LEDs in the accessory assembly 130 allows the reusable surface cover 100 to be used to illuminate dark areas of a room or provide ambiance. In addition, the portability of the battery adapter allows the cover to be used in places where there is no electricity such as in a tent, on a bicycle, skateboard, boat, or any place where there are not readily available electrical outlets.

In another embodiment, a power source such as one or more batteries is disposed within the base layer 120. The power source may be configured to be replaced or recharged so that the LEDs may be used multiple times. Colored LEDs may be used along with additional objects 132 disposed in the accessory assembly 130 to create holiday decorations or illuminated decorations for items such as costumes or clothing. In addition, a receptacle may be disposed at least partially within the base layer 120 or peripheral of the base layer 120 that is configured to be used to charge a smart phone, tablet, or other electronic device. In an embodiment, a switch or button or other suitable means of turning the LEDs on and off is partially disposed within the base layer 120 of the reusable surface cover 100.

In another embodiment, the objects 132 may comprise a luminescent or reflective material that is configured to emit light or reflect light so that it may be easily seen in the dark. This embodiment has an attachment portion 110 that is an adhesive layer configured to attach to a target surface 140 such as a piece of clothing, metal, plastic, wood, glass, skin, or any other such target surface 140 that may need to be visible at night, both indoors and outdoors. In an embodiment, LEDs may also be used along with the luminescent or reflective material in order to improve visibility. In an embodiment, battery powered on and off switch may be embedded in the substrate.

Figure 7:
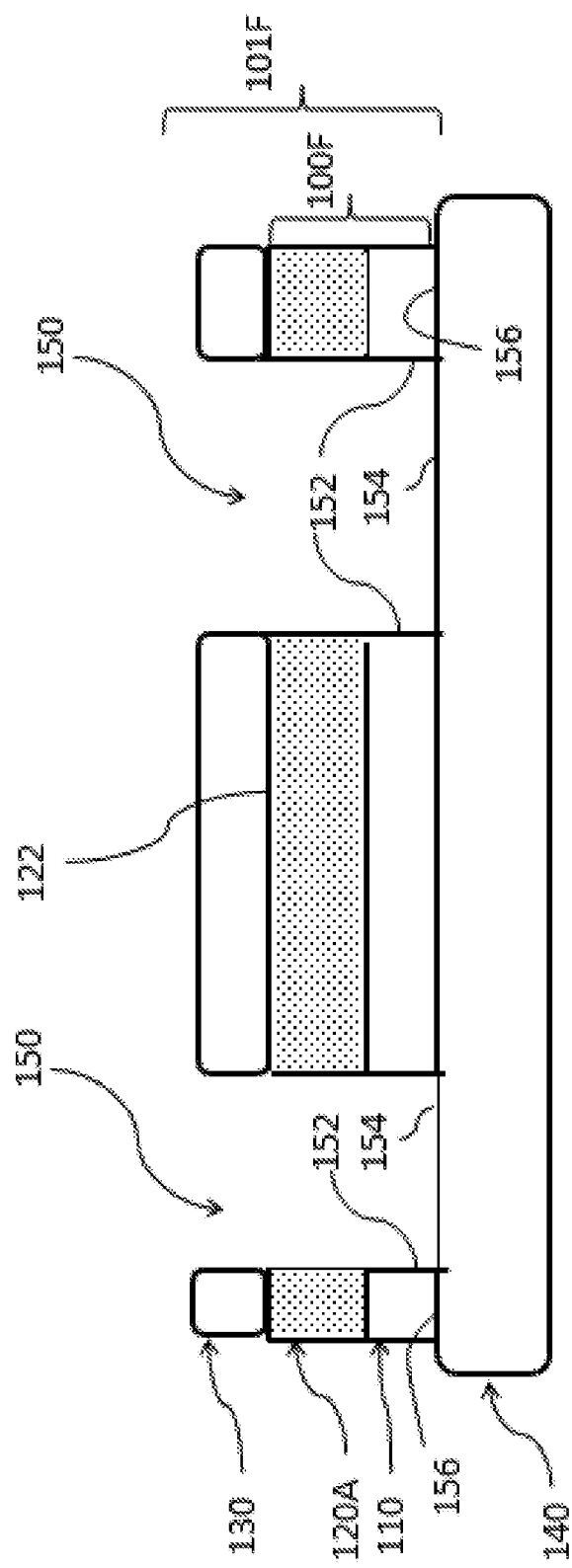
FIG. 7 is a side schematic diagram of an embodiment of the reusable surface cover that defines a plurality of perforations or openings.

In the embodiment shown in FIG. 7, the reusable surface cover 100F has a plurality of holes, perforations or openings 150 that extend entirely through each portion of the reusable surface cover 100F. The inner perimeters 152 of the reusable surface cover 100F define the openings 150. In the example shown, the target surface 140 is a user's skin. Accordingly, the openings 150 expose skin areas 154 of the user's skin to the environment. In this embodiment, the attachment portion 110 may comprise an adhesive layer disposed at least around the perimeter of the reusable surface cover 100. Still referring to FIG. 7, the attachment portion 110 comprises a property that is resistant to moisture, heat, sunlight, and pH such that the reusable surface cover 100F may be worn by the user while swimming, showering, sunbathing or otherwise exposed to sunlight. Depending upon the embodiment, the reusable surface cover 100F may be configured to be coupled to the accessory assembly 130 but not including the accessory assembly 130, or the reusable surface cover 101F may include the accessory assembly 130.

In this embodiment, the base layer 120A is configured to substantially block ultraviolet (UV) rays emitted by the sun and thereby prevents tanning of the skin areas 156 shielded by the base layer 120A. Depending upon the embodiment, the base layer 120A can be opaque, substantially opaque, have reflective properties or have other properties that block sunlight penetration. When the user wears the reusable surface cover 100 out in the sun, the plurality of openings 150 allow sunlight to reach the user's skin area 154 and tan that skin area 154 while the base layer 120 shields the other skin areas 156 from the sun, thereby preventing them from tanning. The result is a "sun tattoo" that is easy to achieve and does not require ink or needles. Put another way, the shapes of the openings 150 can be customized to define letters, words, pictures, drawings or other symbols. These symbols appear as tanned areas 154. In an embodiment, the base layer 120 may be a skin-tone color or may include one or more objects 132 such as a decal or fashion forward patterned material, such as a paisley or kaleidoscope-like pattern, in the accessory assembly 130.

Figure 8A:
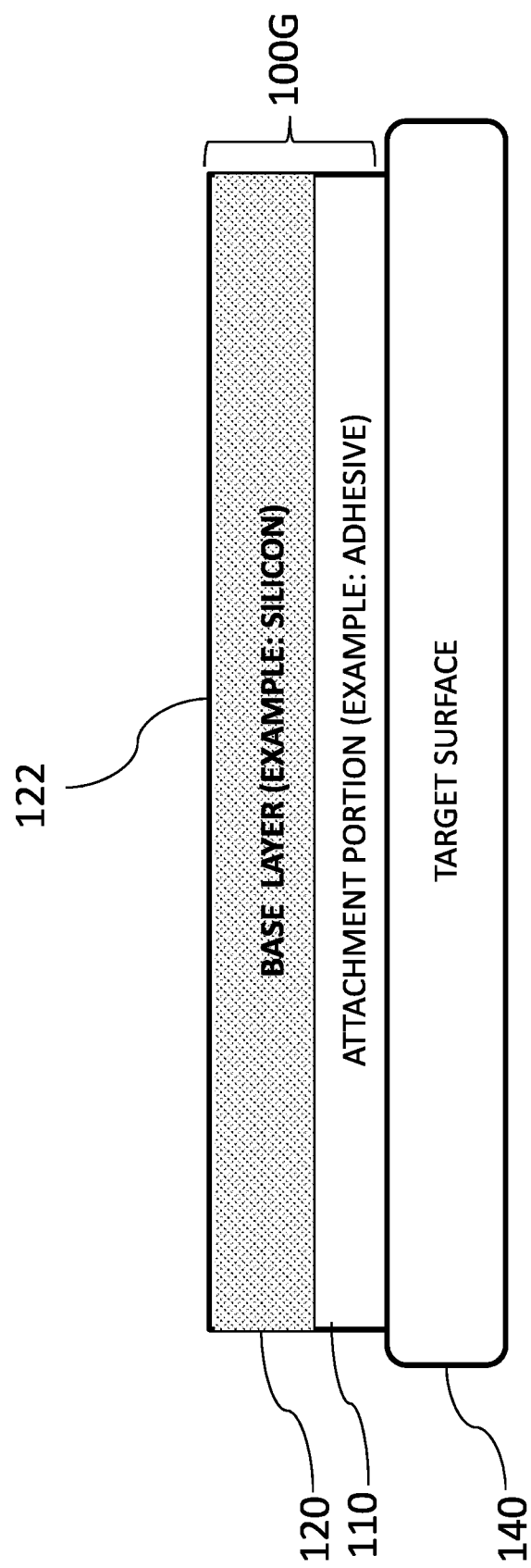
FIG. 8A is a side schematic diagram of an embodiment of the reusable surface cover, illustrated without an accessory assembly, that is configured to be coupled to an accessory assembly.

In another embodiment illustrated in FIGS. 8A-8C, the reusable surface cover 100G is the same as reusable surface cover 100F except that the reusable surface cover 100G has no openings 150 or accessory assembly 130. Accordingly, if a user has undesired tattoos, bruises, scars, skin blemishes or other marks, such as mark 158, the user can adhere the reusable surface cover 100G to the user's skin to cover and conceal the mark 158. In an embodiment, the base layer 120A of reusable surface cover 100G has a material, dye, pigment or coloring that corresponds to or matches the skin-tone color of the user's target surface 140. An embodiment includes a kit of reusable surface covers 100G of different colors or shades that correspond to or match a plurality of different skin tones. Based on the color match, the outer surface 122 (and entire reusable surface cover 100G) is not visibly distinguished from the target surface 140 of the user's skin, as illustrated in FIG. 8D.

The reusable surface cover 100 can be attached to the target surface 140 in a variety of methods. In one embodiment, the method involves: (a) cutting the size or shape of the reusable surface cover 100 as desired; (b) removing a protective backing from the attachment portion 110; (c) placing the reusable surface cover 100 on the target surface 140; and (d) placing sufficient pressure to secure the reusable surface cover 100 to the target surface 140.

In an embodiment, the reusable surface cover 100 can be manufactured by the following steps: (a) providing the base layer 120; (b) applying the attachment portion 110 to the bottom of the base layer 120; and (c) securing a removable backing to the attachment portion 110. To attach the accessory assembly 130, the assembler can couple the accessory assembly 130 to the base layer 120 as described above. Optionally, the assembler can pre-cut the reusable surface cover 100 to certain sizes, shapes, or designated symbols.

Additional embodiments include any one of the embodiments described above and described in any and all exhibits and other materials submitted herewith, where one or more of its components, functionalities or structures is interchanged with, replaced by or augmented by one or more of the components, functionalities or structures of a different embodiment described above. For example, the parts, structure, characteristics, elements and functionalities of the reusable surface covers 100, 101, 100A, 101A, 100B, 101B, 100C, 100D, 101D, 100E, 101E, 100F, 101F, 100G and 102 can be interchanged with one another to define alternative embodiments.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claim. Moreover, although specific terms are employed herein, as well as in the claim which follows, they are used only in a generic and descriptive sense, and not for the purposes of limiting the present disclosure, nor the claim which follows.

The following is claimed:

1. A wearable surface cover comprising:
at least one layer comprising:
an inner surface configured to be removably coupled to a target surface;
an outer surface, and
silicone; and
a plurality of couplers, wherein each of the plurality of couplers partially extends into the at least one layer and is configured to couple to at least one object,
wherein the at least one layer defines at least one opening that extends through the at least one layer,
wherein the opening is configured to expose the target surface to an environment,
wherein the at least one layer is configured to be removed from the target surface after a use and then reused again at a later time.

2. The wearable surface cover of claim 1, wherein the at least one opening has a shape corresponding to a designated symbol.

3. The wearable surface cover of claim 2, wherein the designated symbol comprises at least one of a letter, a number, a picture, an artwork, a drawing, and an image.

4. The wearable surface cover of claim 1, wherein the silicone comprises a characteristic that enables the at least one layer to be removably coupled to a skin surface.

5. The wearable surface cover of claim 1, wherein the at least one layer comprises a reflective property that blocks sunlight from penetrating to a skin surface.

6. The wearable surface cover of claim 1, wherein the at least one layer is configured to reveal a sun tattoo on a skin surface after the at least one layer is removed from the skin surface following exposure to sunlight.

7. A wearable surface cover comprising:
at least one layer comprising:
an inner surface configured to be removably coupled to a target surface;
an outer surface, and
silicone; and
at least one coupler partially extending into the at least one layer, the at least one coupler configured to couple at least one object to the at least one layer, wherein the at least one object is positioned entirely beyond the outer surface,
wherein the at least one layer defines an opening that extends through the at least one layer,
wherein the opening is configured to expose the target surface to an environment,
wherein the at least one layer is configured to be removed from the target surface after a use and then reused again at a later time.

8. The wearable surface cover of claim 7, wherein the opening comprises a shape corresponding to a designated symbol.

9. The wearable surface cover of claim 8, wherein the designated symbol comprises at least one of a letter, a number, a picture, an artwork, a drawing, and an image.

10. The wearable surface cover of claim 7, wherein:
a portion of the at least one layer is configured to block sunlight of the environment; and
the opening is surrounded by the portion.

11. The wearable surface cover of claim 10, wherein the opening is configured to enable sunlight to reach an area of the target surface.

12. The wearable surface cover of claim 7, wherein a portion of the at least one layer is configured to impede sunlight from reaching an area of the target surface.

13. The wearable surface cover of claim 7, wherein the target surface comprises a skin surface.

14. The wearable surface cover of claim 13, wherein the silicone is configured to facilitate removal of the at least one layer from the skin surface.

15. A method for manufacturing a wearable surface cover, the method comprising:
configuring at least one layer to comprise:
an inner surface that is configured to be removably coupled to a target surface;
an outer surface; and
silicone;
structuring at least one coupler to:
partially extend into the at least one layer, and
couple at least one object to the at least one layer, wherein the at least one object is positioned entirely beyond the outer surface; and
forming an opening that extends through the at least one layer,
wherein the opening is configured to expose a portion of the target surface to an environment,
wherein the at least one layer is configured to be removed from the target surface after a use and then reused again at a later time.

16. The method of claim 15, wherein the opening comprises a shape corresponding to a designated symbol.

17. The method of claim 16, wherein the at least one object comprises
a three-dimensional head object.

18. The method of claim 15, wherein the opening is surrounded by a portion of the at least one layer, wherein the portion is configured to impede sunlight from penetrating to the target surface.

19. The method of claim 18, wherein the opening is configured to enable the sunlight to reach the target surface.

20. The method of claim 19, wherein:
   the target surface comprises a skin surface; and
   the silicone is configured to facilitate a removal of the at least one layer from the skin surface.

\* \* \* \* \*